G. F. SMITH.
STEERING AND CONTROLLING MECHANISM FOR MOTOR VEHICLES.
APPLICATION FILED MAR. 13, 1911.
1,010,082.
Patented Nov. 28, 1911.
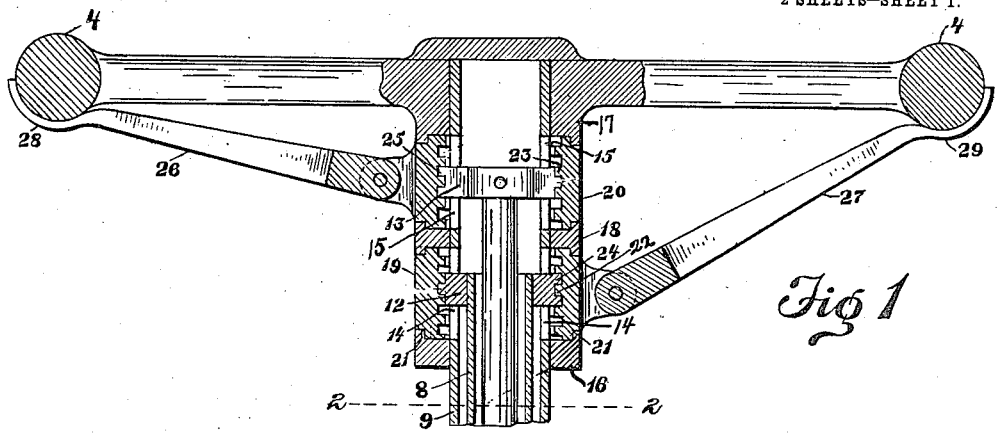
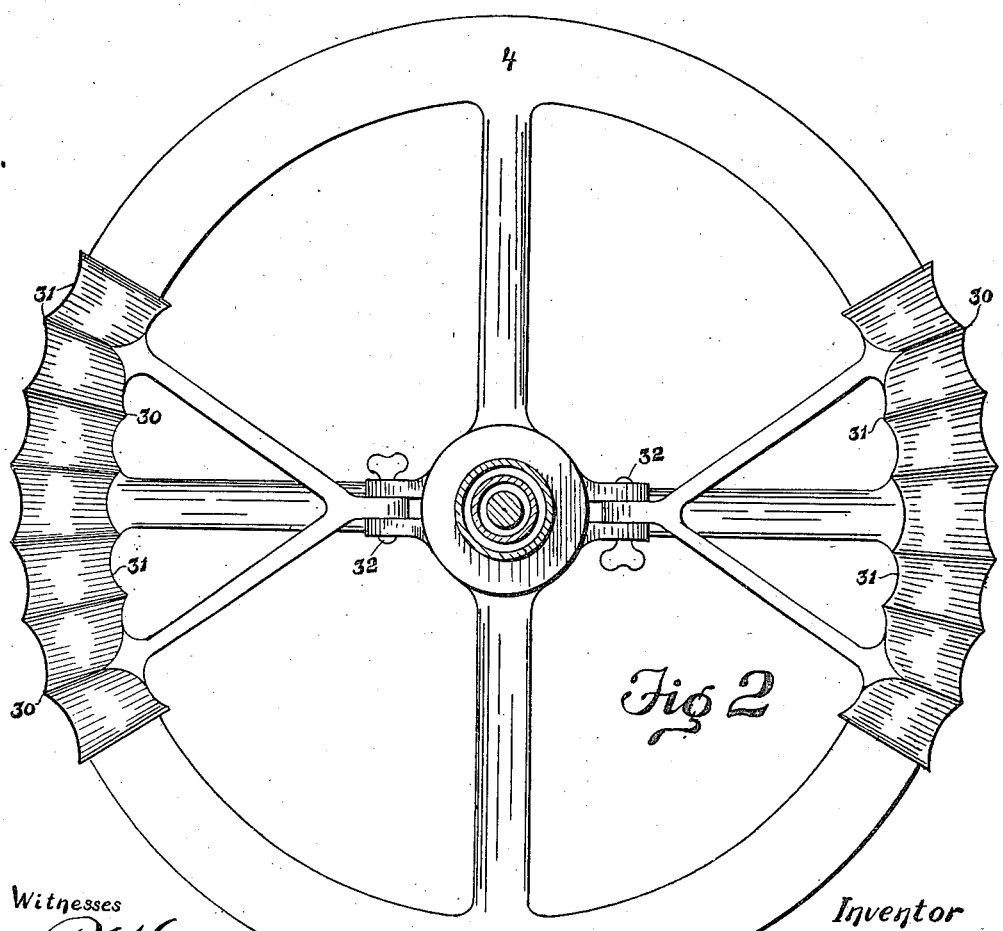
Witnesses
Inventor
Gustavus F. Smith,
By Harry Frease
Attorney G. F. SMITH.
STEERING AND CONTROLLING MECHANISM FOR MOTOR VEHICLES.
APPLICATION FILED MAR. 13, 1911.

1,010,082.

Patented Nov. 28, 1911.

2 SHEETS—SHEET 2.

Witnesses
R. P. Kohl
Ruth A. Miller

Inventor
Gustavus F. Smith
By Harry Frease
Attorney

UNITED STATES PATENT OFFICE.

GUSTAVUS F. SMITH, OF NEW BERLIN, OHIO.

STEERING AND CONTROLLING MECHANISM FOR MOTOR-VEHICLES.

1,010,082.   Specification of Letters Patent.   Patented Nov. 28, 1911.

Application filed March 13, 1911. Serial No. 614,168.

*To all whom it may concern:*

Be it known that I, GUSTAVUS F. SMITH, a citizen of the United States, residing at New Berlin, in the county of Stark and State of Ohio, have invented a certain new and useful Improved Steering and Controlling Mechanism for Motor-Vehicles, of which the following is a specification.

The invention relates to means for controlling the throttle and ignition mechanisms, combined with the steering mechanism of a motor vehicle, whereby all these mechanisms can be conveniently operated by the hands of the chauffeur applied directly to the rim of the steering wheel. A preferred embodiment of the invention, thus set forth in general terms, is attained by the mechanism, construction and arrangement illustrated in the accompanying drawings, forming part hereof, in which—

Figure 3:
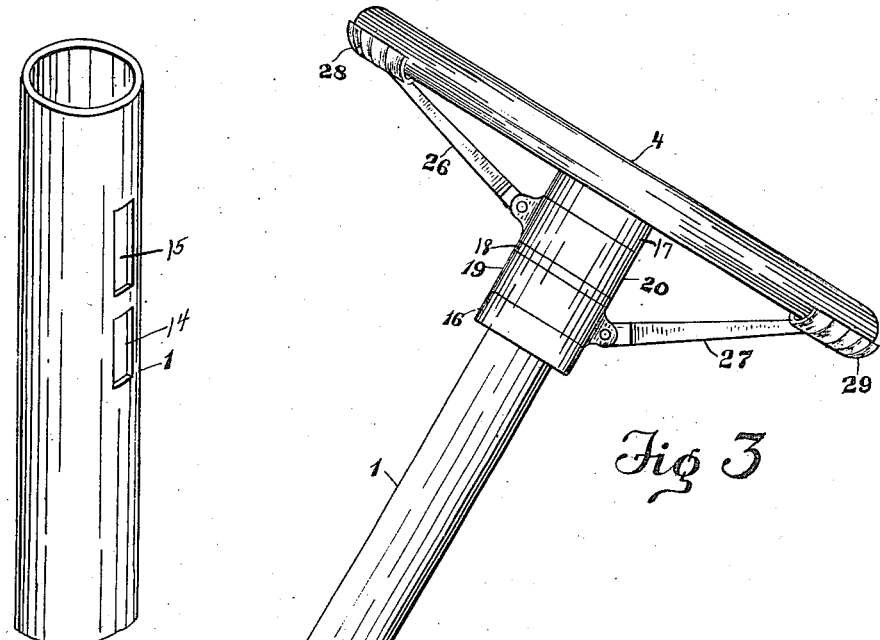
Figure 4:
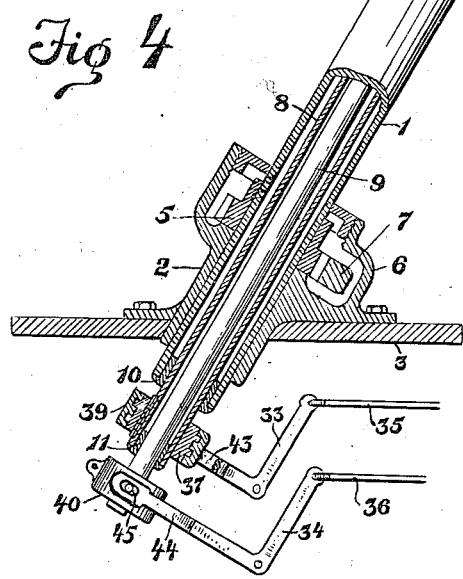
Figure 5:
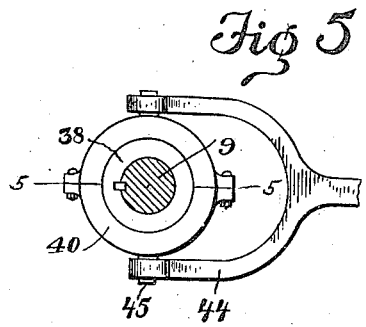
Figure 6:
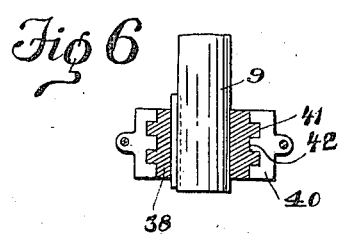

Figure 1 is a side elevation, partly in section, of the steering head and shank; Fig. 2, an under side view of the steering head, showing the shank in section on line 2—2, Fig. 1; Fig. 3, a side elevation of the steering head and shank showing the lower part in section; Fig. 4, a detached perspective view of the upper end of the steering shank; Fig. 5, an enlarged lower end view of the sparker-swivel and yoke; and Fig. 6, a section of the sparker-swivel on line 5—5, Fig. 4.

Similar numerals refer to similar parts throughout the drawings.

The shank of the steering mechanism is composed of the rotatable tube 1, the lower end of which is journaled in the bearing 2 formed or secured to the bottom or frame 3 of the vehicle, and on the upper end of the tubular shank 1 is formed or secured the steering wheel 4. The pinion 5 is secured on the lower end of the tubular shank, and is preferably located within the case 6 formed or secured on the bearing 2, and the rotatable movement of the steering shank is communicated to the steering gear (not shown) by means of the laterally movable rack 7, which meshes with the pinion 5.

The shank of the throttle-controlling mechanism is composed of the preferably hollow or tubular bar 8 mounted inside the steering shank and preferably coaxial therewith, and is adapted to rotate therewith and also to move endwise therein; and the shank 9 of the ignition-controlling mechanism is preferably composed of the rod or bar 9 which in turn is mounted, preferably co-axially, inside the throttle shank 8 and is furthermore adapted to rotate therewith and to operate endwise therein. The lower end of the throttle shank 8 is preferably guided in its endwise movements and held co-axially in the steering shank 1 by the guide bushing 10 formed or secured in the lower end thereof and fitted to the external cross section of the throttle-shank 8; and the lower end of the ignition-shank 9 is guided in its endwise movements and held co-axially in the throttle-shank 8 by means of the guide bushing 11 formed or secured in the lower end of the throttle shank. It will be understood that the particular manner of associating the several shanks, thus set forth, is not essential for the general purposes of the invention, although the same is a very desirable arrangement of these parts. The cross head 12 is formed or secured on the upper end of the throttle shank 8, and the cross head 13 is formed or secured on the upper end of the sparker shank 9, which cross heads protrude through the longitudinal guide slots 14 and 15 provided in opposite walls of the steering shank 1 at or near the upper end thereof. The slots 14 and 15 are each made somewhat longer than the depth of the cross heads, so that while the cross heads and the corresponding shanks are permitted to move endwise within the limits of the slots, the engagement of the cross heads within the sides of the slots requires the throttle shank and the ignition shank to rotate with the steering shank. The collar 16 is secured around the steering shank 1 at the lower end of the guide slots 14, and the collar 17 is formed or secured on the steering shank at or near the upper ends of the guide slots 15, which latter collar, as shown, is preferably formed on the hub of the steering wheel; and the intervening collar 18 when used is either securely or loosely mounted around the steering shank between the guide slots 14 and 15. The cylindric sleeves 19 and 20 are rotatably mounted around the steering shank between the respective collars described above, and the rabbeted annular bearings 21 are preferably provided to hold these sleeves coaxial with the shanks and collars and to stop the sleeves from endwise movement. These sleeves are preferably of a length corresponding to the length of the respective guide slots, and are provided with the internal screw threads 22 and 23 which are adapted to mesh with the sprockets 24 and 25 on the ends of the cross heads of the throttle and ignition shanks; whereby a rotation of the respective sleeves serves to move the corresponding cross heads upward and downward, within the limits of the guide slots, it being understood that in this rotation the sleeves are held against endwise movement by the respective collars, and that the use of the intervening collar 18 is not essential. The arms 26 and 27 are extended from the respective sleeves and terminate in the grip handles 28 and 29 which are preferably semi-cylindrical in form and longitudinally curved as circular arcs to fit the lower side of the rim of the wheel 4; and the lower sides of these handles may be formed, as shown, with the alternate radial ridges 30 and intervening grooves 31, which grooves are adapted to receive the fingers of the chauffeur. These arms may be secured to the sleeves by means of the clamping screw-pivots 32, in which event the arms are adapted to be frictionally held in various positions of rotation on the pivots, but for the purposes of this invention the grip handles 28 and 29 are preferably positioned in contact with the rim of the wheel 4. It is evident that the frictional joint, or the spring of the arms, will permit the handles to be clamped tightly against the rim of the steering wheel by the grip of the chauffeur, or to slide freely around the same when the grip of the chauffeur is released. By this construction and arrangement of the parts it is evident that, when the chauffeur grasps the steering wheel, he can at the same time with the fingers of one hand grasp the handle of the arm 26, which may be called the throttle-controlling arm, and with the fingers of the other hand the handle 29 of the arm 27, which may be called the ignition-controlling arm; and that, by grasping these handles tightly against the rim of the steering wheel, the various shanks will be rotated together, without any endwise movement whatever on the part of the throttle shank and ignition shank; but that if the grip of the fingers is sufficiently loosened in either hand, so that the corresponding handle may rotate with respect to the steering wheel by sliding around the same, the corresponding screw sleeve will be rotated with reference to the steering shank, which rotation will move the corresponding cross head and its connected shank upward or downward within the steering shank. The endwise movement thus given to either one or both of the throttle shank or the ignition shank is communicated to the throttle mechanism and the ignition mechanism (not shown), by means of the bellcranks 33 and 34 and the connecting rods 35 and 36, which bellcranks are connected with the respective shanks by means of suitable swivel joints, which, as shown, may consist of the collars 37 and 38, keyed or otherwise secured on the lower ends of the respective shanks, the encircling rotatable collars 39 and 40, with the interengaging annular grooves and ribs 41 and 42, and the yokes 43 and 44 formed on the corresponding arms of the bellcranks and engaged on the trunnions 45 provided on the encircling collars.

I claim:

1. A steering mechanism for a motor vehicle including a rotatable hollow steering shank with a wheel thereon and having longitudinal slots in its walls, an endwise movable shank in the steering shank having a cross head with sprockets protruding through the slots, an endwise-stopped rotatable sleeve around the steering shank having an internal screw thread meshing with the sprockets, and an arm extended from the sleeve having a handle slidably fitting one side of the rim of the steering wheel.

2. A steering mechanism for a motor vehicle including a rotatable hollow steering shank with a wheel thereon and having longitudinal slots in its walls, an endwise movable shank in the steering shank having a cross head with sprockets protruding through the slots, an endwise-stopped rotatable sleeve around the steering shank having an internal screw thread meshing with the sprockets, and an arm extended from the sleeve having a handle in sliding contact with the rim of the steering wheel.

3. A steering mechanism for a motor vehicle including a rotatable hollow steering shank with a wheel thereon and having longitudinal slots in its walls, an endwise movable tubular shank in the steering shank having a cross head with sprockets protruding through corresponding slots, an endwise movable shank in the tubular shank also having a cross head with sprockets protruding through corresponding slots, and endwise-stopped rotatable sleeves around the steering shank having internal screw threads meshing with the respective sprockets.

4. A steering mechanism for a motor vehicle including a rotatable hollow steering shank with a wheel thereon and having longitudinal slots in its walls, an endwise movable shank in the steering shank having a cross head with sprockets protruding through the slots, and an endwise-stopped rotatable sleeve around the steering shank having an internal screw thread meshing with the sprockets.

5. A steering mechanism for a motor vehicle including a rotatable steering shank with a wheel thereon, a plurality of endwise-movable motor controlling shanks associated with the steering shank and rotatable therewith, means operative by rotation on the steering shank for moving the associated shanks endwise and having circular-arc handles in sliding contact with the rim of the steering wheel.

6. A steering mechanism for a motor vehicle including a rotatable steering shank with a wheel thereon, a plurality of endwise-movable controlling shanks telescoped with the steering shank and rotatable therewith, means operative by rotation on the steering shank for moving the telescoped shanks endwise and having circular-arc handles in sliding contact with the rim of the steering wheel.

7. A steering mechanism for a motor vehicle including a rotatable steering shank with a wheel thereon, an endwise-movable motor controlling shank associated with the steering shank and rotatable therewith, means operative by rotation on the steering shank for moving the associated shank endwise and having a circular-arc handle in sliding contact with the rim of the steering wheel.

8. A steering mechanism for a motor vehicle including a rotatable steering shank with a wheel thereon, an endwise-movable motor controlling shank telescoped with the steering shank and rotatable therewith, means operative by rotation on the steering shank for moving the telescoped shank endwise and having a circular-arc handle in sliding contact with the rim of the steering wheel.

9. A steering mechanism for a motor vehicle including a rotatable steering shank with a wheel thereon, a plurality of means operative by rotation on the steering shank for controlling respective motor mechanisms and having circular-arc handles slidably fitting the side of the rim of the steering wheel.

10. A steering and controlling mechanism for motor vehicles, including a rotatable steering shank with a wheel thereon, means operative by rotation on the steering shank for controlling a motor mechanism and having a circular-arc handle slidably fitting the side of the rim of the steering wheel.

11. A steering mechanism for a motor vehicle including a rotatable steering shank with a wheel thereon, a plurality of means operative by rotation on the steering shank for controlling respective motor mechanisms and having circular-arc handles in sliding contact with the rim of the steering wheel.

12. A steering mechanism for motor vehicles, including a rotatable steering shank with a wheel thereon, means operative by rotation on the steering shank for controlling a motor mechanism and having a circular-arc handle in sliding contact with the rim of the steering wheel.

GUSTAVUS F. SMITH.

Witnesses:
  HARRY FREASE,
  FERD J. ZETTLER,